(12) United States Patent
McAuley

(10) Patent No.: US 6,298,572 B1
(45) Date of Patent: Oct. 9, 2001

(54) UNIVERSAL HOLDING DEVICE FOR EFFECTUATING THREE DIMENSIONAL MEASUREMENT OF A PART AND METHOD OF CONSTRUCTING SUCH A HOLDING DEVICE

(76) Inventor: Brian McAuley, 39068 Schroeder, Clinton Twp., MI (US) 48038

(*) Notice: Subject to any disclaimer, the term of this patent is extended or adjusted under 35 U.S.C. 154(b) by 0 days.

(21) Appl. No.: 09/480,445

(22) Filed: Jan. 10, 2000

(51) Int. Cl.⁷ .................................................. G01B 5/20
(52) U.S. Cl. .......................... 33/573; 033/503; 033/555; 033/568; 269/37
(58) Field of Search .......................... 33/573, 502, 503, 33/549, 550, 551, 552, 553, 554, 555, 568, 569, 570; 269/9, 37, 40, 55, 56, 58, 59, 45

(56) References Cited

U.S. PATENT DOCUMENTS

| | | |
|---|---|---|
| 4,593,476 * | 6/1986 | Clark et al. ............................. 33/553 |
| 4,691,446 | 9/1987 | Pitches et al. . |
| 4,848,005 | 7/1989 | Ercole et al. ........................... 33/573 |
| 4,961,267 | 10/1990 | Herzog . |
| 5,058,433 | 10/1991 | Wilson et al. . |
| 5,086,569 | 2/1992 | Possati et al. . |
| 5,107,599 | 4/1992 | Marincic et al. ...................... 33/573 |
| 5,193,286 * | 3/1993 | Collier ................................... 33/503 |
| 5,400,522 | 3/1995 | Kremer et al. . |
| 5,412,880 | 5/1995 | Raab . |
| 5,481,811 | 1/1996 | Smith ..................................... 33/573 |
| 5,625,959 | 5/1997 | Ercole et al. .......................... 33/568 |
| 5,653,038 | 8/1997 | Hunter .................................. 33/573 |
| 5,735,056 * | 4/1998 | Gosine ................................... 33/573 |
| 5,829,151 | 11/1998 | Collier et al. ......................... 33/573 |
| 5,848,480 | 12/1998 | Sola et al. ............................. 33/573 |
| 5,890,300 | 4/1999 | Brenner et al. . |
| 5,901,455 | 5/1999 | Leitenberger et al. . |
| 5,909,939 | 6/1999 | Fugmann . |
| 5,956,857 | 9/1999 | Raab . |
| 6,145,212 * | 11/2000 | Geise et al. ........................... 33/549 |

OTHER PUBLICATIONS

Metronor Inc. Brochure. (Date Unknown)

* cited by examiner

Primary Examiner—Christopher W. Fulton
(74) Attorney, Agent, or Firm—Gifford, Krass, Groh, Sprinkle, Anderson & Citkowski, P.C.

(57) ABSTRACT

A fixture assembly for holding a part to be measured in a specified and elevated orientation and being utilized in combination with an existing coordinate measurement machine. A transportable body is provided having a horizontally arrayed and upwardly facing platform. The coordinate measurement machine is adapted to be arranged in proximity to the transportable body. First, second and third datum blocks are secured upon the upwardly facing platform at first, second and third selected locations. Each of the datum blocks further includes an upwardly facing tapped hole for receiving a measurement target which is capable of being manipulated according to instructions provided by the coordinate measurement machine to define first, second and third datum planes according to a coordinate system defined for the part to be measured. A plurality of individual support units are secured upon the platform at locations specified by the coordinate measurement machine. The individual support units each further include an upwardly facing receptacle bushing within which is defined a tapped hole for receiving one of any suitable type of measurement target and is capable of being manipulated according to instructions provided by the coordinate measurement machine to define an associated plurality of individual part supporting points. Each of the measurement targets within the receptacle bushing is replaced by a part support pin upon the coordinate measurement machine defining a correct location for the supporting point.

17 Claims, 5 Drawing Sheets

UNIVERSAL HOLDING DEVICE FOR EFFECTUATING THREE DIMENSIONAL MEASUREMENT OF A PART AND METHOD OF CONSTRUCTING SUCH A HOLDING DEVICE

BACKGROUND OF THE INVENTION

1. Field of the Invention

The present invention relates generally to part holding devices for use with coordinate measurement machines and, more particularly, to a universal part holding device and method for constructing such a holding device for effectuating three dimensional measurement of such a part and which is easily adaptable to any portable or stationary three dimensional measurement system.

2. Description of the Prior Art

Coordinate measurement machines and part holding fixtures are well known in the art. Such machines are usually considered to be very precise in the measuring of tooling and miscellaneous workpieces and in certifying tooling. The coordinate measurement machine (or CMM) is typically assembled in a separate climate controlled room to achieve the required accuracy during part measurement. Examples of measurement systems include portable coordinate measurement machines, laser trackers, photogrammetry systems and the like.

A particularly useful measurement device is the camera-based and electro-optical portable coordinate measurement machine providing fast and accurate three-dimensional data and being commercially known in one variant as the Metronor system. Typically, the Metronor system includes two such camera devices arrayed in a spaced and desired angular orientation relative to the part holding fixture and cooperating with a portable light pen having one or more active LED's (light emitting diodes). The light pen is capable of being placed against selected points upon the part held within the fixture so that the cameras can register extremely accurate measured distances to provide detailed three dimensional data.

Along with a specified means for measuring part dimension, a CMM holding fixture is designed and built for each part or sub-assembly. The holding fixture consists of pins, net blocks, and clamps to hold parts at specified orientations. Each pin and net block is located within a specified build tolerance. Known problems associated with conventional CMM's include their tendency to lose accuracy over time and to require time expensive recalibration to retain their accuracy.

An example of the prior art is illustrated by U.S. Pat. No. 4,848,005, issued to Ercole et al., which teaches a rearrangeable supporting and positionable fixture for parts measurable on a gauging machine. The fixture includes a number of rearrangeable elements, a hand operated by a robot and designed to position the elements on a reference table. Similarly, U.S. Pat. No. 5,6245,959, also issued to Ercole, again teaches a fixture for positioning and supporting parts for measurement. According to the '959 disclosure, the reconfigurable supporting elements include first portions positionable on the reference surface of the machine. Second portions positionable in relation to the first portions are arrayed in a direction perpendicular to the reference surface. A reference tool positioned automatically by the machine and presenting a three-dimensional reference for the second portion of the supporting elements, the supporting elements being moved manually over the reference surface and so that the second portion contacts the reference tool prior to being clamped in position. U.S. Pat. No. 5,848,480, issued to Sola et al., teaches a still further variation of a reconfigurable supporting fixture for a measuring machine and which again includes a number of reconfigurable supporting elements.

The reference systems as discussed above are based upon the calibration of the measurement machine. The positioning of all components that establish the reference system are held to machine-specific build tolerances and require a very high degree of precision. Accordingly, it is essentially impossible to create an error-free reference system for part measurement as a result of these build tolerances. The reconfigurable fixtures are further specifically designed for a single type of measuring device and further possess limited load capacity and limited capability for moving supporting elements. Furthermore, the holding fixtures described above only support the parts in a vertical manner and no provision is made for additionally securing the part to be measured in a horizontally and rotatably restricted fashion.

Referring to U.S. Pat. No. 5,107,599, issued to Marincic et al., a universal part holding fixture is disclosed for a coordinate measurement machine which utilizes a plurality of ball detent retainers bolted to a base plate to allow part holders to be set up and removed with improved speed and accuracy. Pluralities of threaded and non-threaded holes are provided formed through the base and receive clamping portions of associated part holders. Each four hole set must be machined in the base at known precise locations. The base must be precisely aligned and squared to the CMM's reference system. At one corner of the bases a sphere is inserted into a mounted retainer and measured to find the center point. The CMM translates the reference system to this center point. Accordingly, the device of Marincic creates two sources of potential error with this application, one for the build tolerances of the CMM and one for the positional error of the base. As with the prior described references, each part holder in Marincic is uniquely tailored to each part to be supported.

U.S. Pat. No. 5,909,939, issued to Fugmann, discloses a CMM machine having a stationary base plate, a workpiece receptacle, a tracing head movable relative to the baseplate, and a supply, control and evaluation device. The baseplate includes legs which are mounted pivotably on at least three fixed locations on the baseplate and on a body which carries the tracing head. The length or the inclinations of the legs can be adjusted in an accurately measurable manner.

Finally, U.S. Pat. No. 5,829,151, issued to Collier et al., teaches a multi-axis part positioning system for holding a component relative to an established reference frame and which is usable with any type of coordinate measurement or numerical control machine. The fixture includes a base fixable relative to the established reference frame, and a plurality of stanchions continuously movable along a plane defined by a surface of the base. Each of the stanchions are engaged by a dual-axis linear stepped motor that actuates the associated stanchions along a dual axis (x,y) grid pattern machined into the base. The stepper motor is also coupled to a vertical jack screw so that a height of the screw is established by a determined number of rotations of the stepped motor. As with the afore-described references, the fabrication of the part positioning system according to Collier is fairly costly and requires a very high degree of precision.

SUMMARY OF THE PRESENT INVENTION

The present invention is a universal part holding device and fixture and method of construction which is easily adaptable for use with any type of existing coordinate measurement machine for accomplishing three dimensional measurement of a part and in a significantly improved fashion over the existing technologies. As will be described in greater detail, the present invention provides a device and fixture and method of construction which is a significant improvement over the existing technical art in that it permits rapid and universal adaptability to any portable or stationary three dimensional measurement system, establishes such a reference system to a single fixed point, and avoids the time expense and necessity of physical recalibration of one part to a successive part of different geometry.

The invention includes a transportable platform, typically having a standard aluminum base, with a level planar surface and which is supported upon wheels or casters. At one corner of the base is installed a first fixed block, this typically being constructed of aluminum and identified as Datum A. At an opposite corner of the base is formed a second aluminum block (identified as Datum B), this one incorporating a two-way slide assembly which controls movement in both vertical (z axis) and selected horizontal (y axis) axes. At a third corner of the base, generally equal to the distance established between the first and second blocks, is formed a third block (Datum C), which may also be constructed of an aluminum or other suitable material and which includes a single axis slide assembly movable in up and down (again z axis) directions.

Machined into a top of each of the block assemblies is a 0.25' diameter hole to create a receiving bushing, the purpose for which is to receive a measurement target of a specified type and which is utilized in combination with the specified form of measurement technology. As discussed previously, various known measurement systems include photogrammetry systems, LED target systems, reflector targets, hub and probe targets, and laser tracker/system data collection targets. According to one preferred embodiment, a pair of Metronor high resolution Charged-Coupled Device (CCD) Cameras are arranged off to one side of the platform and usually at equal 45° angles. The Metronor Cameras combine the technologies of photogrammetry (vision inspection), coordinate measurement machines (CMM) and computer aided design (CAD) so as to provide an extremely detailed measurement means which is further capable of achieving sub-pixel resolution to an accuracy of 0.01 pixels per a coordinate range of 100,000 by 100,000 pixels. The cameras are typically provided upon a tripod or other mounting structure and in combination cover the three dimensional area upon and above the platform. A computer or other microprocessor driven device is operatively connected to the Metronor cameras.

Inserted within each of the receiving bushings formed in the top of the fixed and sliding blocks identified as datums A, B and C are light emitting diode (L.E.D.) units such as may be typically employed with a light pen usable with the Metronor cameras and for accomplishing the measurement of spatial coordinates in a three dimensional fashion. A suitable software program, known as a Point Location Analysis (or PLA) program is loaded into a computer or suitable microprocessor driven system in operative communication with both the Metronor cameras and which provides variables for creating a three dimensional grid system particular to the part or workpiece to be measured. The software and hardware system provides the Metronor cameras with three required variables or datum's (usually defined in metric millimeters and corresponding to the x, y and z planes previously described). It is necessary to manipulate the blocks assembled upon the platform base in combination with reading the values by the Metronor cameras and comparing those values to that provided by the operating software to define the correctly calibrated three dimensional grid system for the specific part to be measured. All datums are fixed positions, each representing a specific axis with which the three dimensional grid surrounding the tool or part to be measured is thereby constructed.

Each of the LED units previously identified is mounted upon a pin or like structure and is seated within the associated bushing of the fixed Datum Block A, two way slide Datum Block B and single slide Datum Block C. The Point Location Analysis program provides the offset variables for the LEDS relative to their bushing mounts. At this point, the PLA program will determine the overall length and width of the coordinate grid to be established and will calculate the distance between fixed Datum A and two way slide Datum B. Coordinate x, y and z values are entered for each Datum block and pin, as well as similar x, y and z values of two points along each axis representing the size of the parts to be measured.

An operator holds a certified reference bar over the tool in view of both cameras. Embedded within the reference bar are several additional LED units. The distances between the LED's are pre-measured and certified. The reference bar is then rotated vertically, horizontally and at oblique angles to the cameras so that the Metronor system can create an overall calibrated volume of measurement.

At this point, the calibrated volume of measurement created by the Metronor system is translated into an orthogonal coordinate system level to gravity. A first of the pin mounted LED units is installed within the bushing receptacle defined in fixed Datum Block A. The Metronor cameras measure the position of the fixedly mounted LED and respond by creating a mathematical plane (z plane) level to gravity and through the LED point of Datum A.

A second LED is attached to the two-way slide of Datum B. The Metronor system measures the position of the second LED and compares to its stored and desired values. The operator repositions the second LED in a first up or down direction along one slide and until the second LED intersects the plane created through the first LED (Datum A). At this point, the vertical slide is locked in place and the operator then proceeds to actuate the horizontal (y plane) slide in directions towards and away from Datum A until a measured distance between Datum A and Datum B equals that assigned by the PLA software program. At this point the second slide is locked in place and a second plane (y plane) is created through Datum LED points "A" and "B" and perpendicular to the z plane.

A third LED unit is attached to the one way slide of Datum C and is moved up or down until the LED point intersects the plane created through Datum A (z plane). The Metronor operator then creates a third plane (x plane) through the Datum point "A" and which is perpendicular to both the "y" and "z" planes. The calibrated volume of measurement created earlier is now an orthogonal coordinate system and, using data collected earlier from the software program, the operator will reassign x, y and z coordinates for Datum's A, B and C. The Metronor system will then translate all data to create a volume of measurement that is orthogonal and in the body coordinate of the part or subassembly to be measured.

At this point, it is now necessary to locate and secure a determined plurality of individual positionable and supporting units upon the platform surface of the part holding fixture device. The planar surface of the platform assembly is further defined by an xy grid of spaced apart tap holes, these each typically being 3/8" in diameter and according to any desired depth. The holes are further preferably spaced at 2" increments.

Each of the positionable and supporting units include a platform base suitable for engaging a set subplurality of tap holes according to the platform grid. The positionable/ supporting units are each further constructed with first, second and third slides, each further controlled by adjustment handles or screws. The slides permit each unit to be adjusted along each of the three axes. A block with a tapped hole (typically 1.0" in diameter) is mounted to the vertical surface of each up and down slide of a select unit. A 1.0" diameter threaded rod with a 0.25" diameter thread at the top end is inserted into the vertical block and provides additional travel in the vertical direction. An electromagnet with a 0.25" diameter press-fit bushing is attached to the end of the threaded stud. An LED is attached to the electromagnet's bushing and the offset provided by the LED is again compensated for in the program analysis software.

The operator selects a first support unit and places it atop the platform. The unit is moved in a direction to a first locating point assigned by the location analysis software and as read by the Metronor cameras. The Metronor system measures the position of an LED on the unit and compares it to the locating point assigned for the part and according to a CAD model associated with the software. A provisional net point is selected in the software model and which is assigned a 0.50" offset. This temporary center point becomes the nominal location for the associated unit and determines at what location it is secured within associated tap holes of the xy grid pattern, such as through the use of bolt fasteners, pins and other suitable securing means known in the art.

Using the adjustment screws on the unit, the operator moves the LED until its point coordinates are the same as the nominal point on the CAD model. At this point, all three slides are locked in position and the LED for the associated unit is removed and replaced with another pin providing a suitable and upwardly facing workpiece support. Such supports include spherical pins and cylindrical tapered pins. This process is again repeated with an additional positioning and support unit for each CAD assigned support value.

The operating program will determine how many support points are employed for a tool or other workpiece of specified geometry. In most instances, up to several such units are employed and each support pin of an associated unit is arrayed in a different three dimensional coordinate position to assist in support of the part to be measured. The configurations of the support pins further account for their ability to secure the part to be measured in vertically/gravity supported fashion, rotatably resistive supported fashion and pivotally resistive supportive fashion as will be subsequently illustrated in greater detail. The geometry of the part, include bends, dips, recesses, projections and apertures can be exploited along with the arrangement and positioning of the units, as well as the type of support or engagement pin employed, to securely locate and position the part in a resistively held fashion in all directions as previously described. Additionally, a separately affixable clamp may be applied to the unit and to provide additional and downward holding force against the part at a specified location.

The present invention contemplates that the part to be measured and analyzed, typically tooling or the like, is constructed with a primarily steel content. Accordingly, and as a final step, a 12V/24V power supply is engaged and each of the electromagnets previously described are energized so that an electromagnetic flow through the employed support pins and the abutting surfaces of the part draws down and holds the part in immovable and non-vibratory fashion during subsequent measuring and analysis.

The invention also provides the ability to verify the accuracy of the selected measuring system. This is accomplished by removing any or all of the adjustment screws associated with each positioning and support unit and replacing each with a digital micrometer. The digital micrometer typically possesses a certified accuracy of 0.00005" or 0.001 mm and may be quickly employed and compared to what the CMM and Metronor cameras to determine if recalibration of the measurement system is necessary. Such recalibration may be necessary (typically on an yearly basis) due to wear on components which can be in the range of a 1/10 of a millimeter.

A method for constructing a universal part holding device and fixture assembly is further disclosed according to the structure and details previously set forth and includes such steps as the setting up of the Datum points and axes "A", "B" and "C", the establishment of the orthogonal coordinate system, the location and securement of the individual part supporting units upon the platform and the replacement of the measurement target with the pin supports for engaging the part to be measured. Additional steps include the arrangement of the photogrammetry cameras, the employment of coordinate designation software and the use of additional clamps for providing additional holding support of the part at specified locations.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION OF THE PREFERRED EMBODIMENTS

Figure 1:
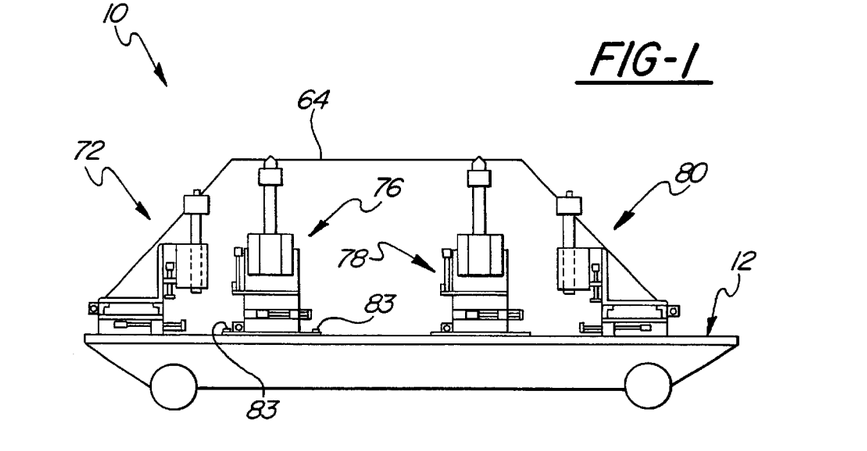
FIG. 1 is a front plan view of the universal part holding device and fixture assembly and illustrating several support and positioning units in place and upon which is engaged a selected part to be measured and analyzed in three dimensional fashion according to the present invention.
Figure 2:
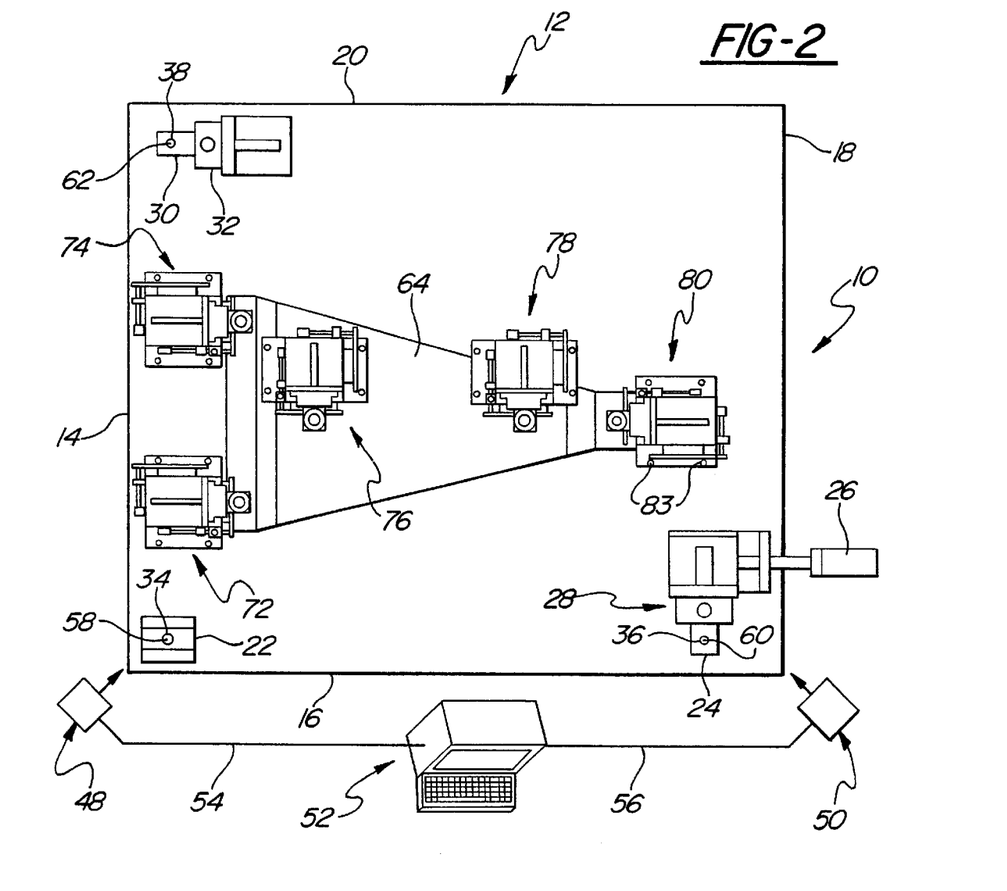
FIG. 2 is a top view of the device and fixture assembly and further illustrating in representational fashion the placement and arrangement of the photogrammetry cameras used with the part holding and fixture assembly of the invention.

Referring now to FIGS. 1 and 2, a universal part holding device and fixture assembly is illustrated at 10 according to the present invention. The part holding device and fixture 10, as well as an associated method of construction, are easily adaptable for use with any type of existing coordinate measurement machine for accomplishing three dimensional measurement of a part in a significantly improved fashion over the existing technologies. As also described, several types of measurement systems are available in the technical art and include coordinate measurement machines, laser trackers and photogrammetry systems. The present invention provides a device and fixture and method of construction which is a significant improvement over the existing technical art in that it permits rapid and universal adaptability to any portable or stationary three dimensional measurement system, establishes such a reference system to a single fixed point, and avoids the time expense and necessity of physical recalibration of one part to a successive part of different geometry.

Figure 3:
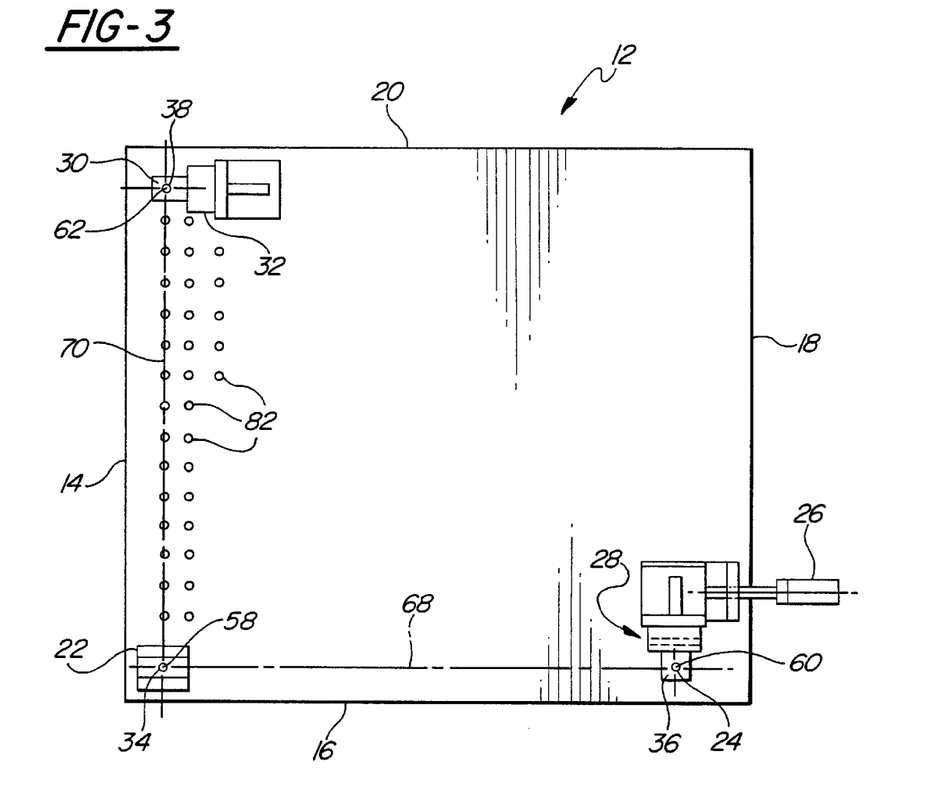
FIG. 3 is a top view similar to that shown in FIG. 2 and further illustrating the first, second and third Datum units arranged upon the transportable platform surface and the x and y planes established during the creation of the orthogonal coordinate system.
Figure 4:
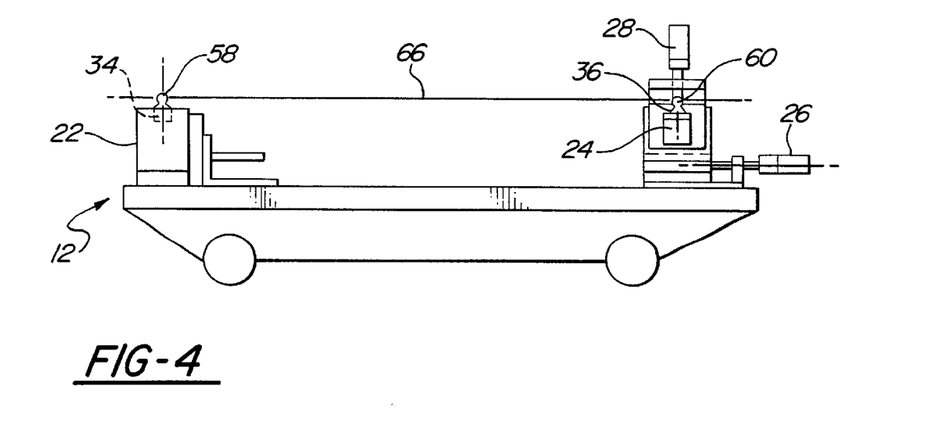
FIG. 4 is another front view and illustrating the z plane which, in combination with the x and y planes, completes the orthogonal coordinate system created according to the present invention.

Referring again to FIGS. 1–4, the invention includes a transportable platform 12, typically having a standard aluminum base, with a level planar surface and which is supported upon wheels or casters. The transportable base 12 is typically constructed so that it is rectangular in overall configuration with first side 14, second side 16, third side 18 and fourth side 20. Referring to FIGS. 2 and 4, at one corner of the base is installed a first fixed block 22, this typically being constructed of aluminum and identified as Datum A. At another corner of the base is formed a second aluminum block 24 (identified as Datum B), which incorporates a first hand operated slide assembly 26 which controls movement in a horizontal (y axis) and a second slide assembly 28 which controls movement in a vertical (z axis) axis. At a third corner of the rectangular base 12, generally equal to the distance established between the first and second Datum blocks 22 and 24, is formed a third block 30 (Datum C), which may also be constructed of an aluminum or other suitable material and which includes a further single axis slide assembly 32 movable in up and down (again z axis) directions.

Figure 6:
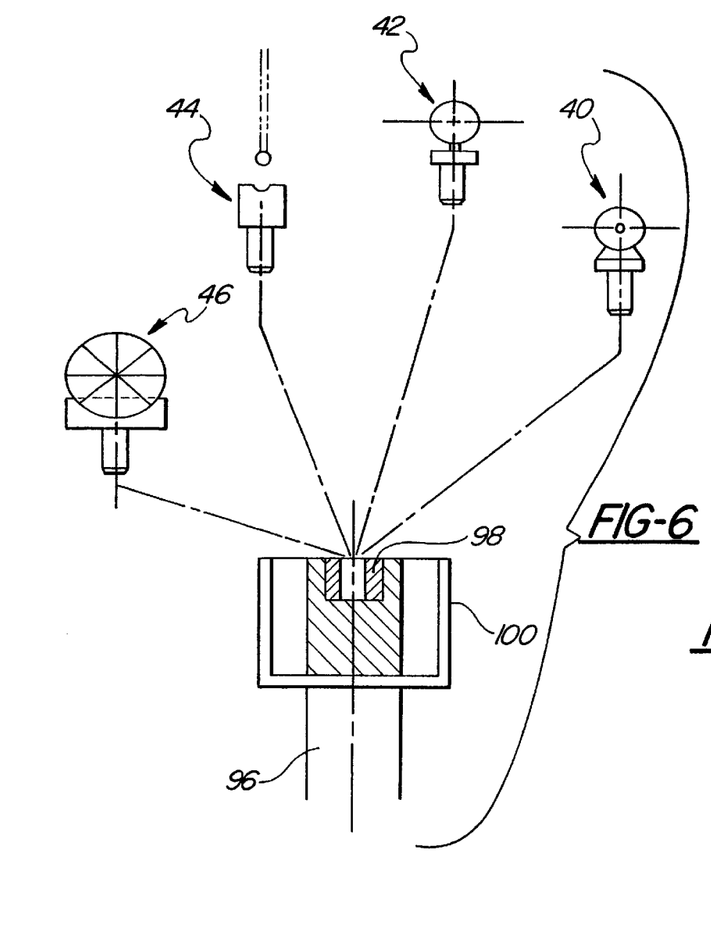
FIG. 6 illustrates an array of measurement targets used by the various measurement technologies and which may be employed with the orthogonal coordinate Datum establishing units and the support and locating units according to the present invention.

Machined into a top of each of the block assemblies is a 0.25" diameter hole to create a receiving bushing, the purpose for which is to receive a measurement target of a specified type and which is utilized in combination with the specified form of measurement technology. While not clearly illustrated, the location of the holes are best shown at 34, 36 and 38 for Datums A, B, and C respectively. As discussed previously, and further referring to FIG. 6, various known measurement systems which may be employed with the present invention include photogrammetry measurement systems such as LED targets 40, reflector targets 42, hub and probe targets 44, and laser tracker/system data collection targets 46. The measurement targets are illustrated in FIG. 6 for use with a selected one of a plurality of location and support units, and as will be subsequently described in greater detail. It is however understood that such measurement targets may just as easily be adaptable for use with the Datum blocks 22, 24 and 30 such as by being mounted atop a suitably dimensioned pin or shaft and inserted within the associated hole 34, 36 or 38.

Referring again to FIG. 1, and according to the illustrated preferred embodiment, a pair of Metronor high resolution Charged-Coupled Device (CCD) Cameras 48 and 50 are arranged off to one side of the platform and usually at equal 45° angles. As previously described, the Metronor Cameras combine the technologies of photogrammetry (vision inspection), coordinate measurement machines (CMM) and computer aided design (CAD) so as to provide an extremely detailed measurement means which is further capable of achieving sub-pixel resolution to an accuracy of 0.01 pixels per a coordinate range of 100,000 by 100,000 pixels. Although not clearly shown, the cameras are typically provided upon a tripod or other mounting structure and in combination cover the entire three dimensional grid above the platform. A computer or other microprocessor driven device is illustrated at 52 and is operatively connected to the Metronor cameras 48 and 50 via communication lines 54 and 56, respectively.

Inserted within each of the receiving holes or bushings 34, 36 and 38 formed in the top of the fixed and sliding blocks identified as datums A, B and C, respectively, are light emitting diode (L.E.D.) units such as may be typically employed with a light pen usable with the Metronor cameras and for accomplishing the measurement of spatial coordinates in a three dimensional fashion. Particularly, L.E.D. units 58, 60 and 62 are illustrated for Datum blocks 22, 24, and 30, respectively.

A suitable software program, such as may be known as a Point Location Analysis (or PLA) program (not illustrated) is loaded into the computer or suitable microprocessor driven system 52 in operative communication with both the Metronor cameras 48 and 50 and provides variables for creating a three dimensional grid system particular to a part 64 (see FIGS. 1 and 2) to be measured. The software and hardware system provides the Metronor cameras 48 and 50 with three required variables or datum's (usually defined in metric millimeters and corresponding to the x, y and z planes previously described). Prior to undertaking three dimensional analysis of the part 64 an overall volumetric area must be defined within which it is confirmed the part 64 is contained. It is also necessary to manipulate the blocks assembled upon the platform base in combination with reading the values by the Metronor cameras and comparing those values to that provided by the operating software to define the correctly calibrated three dimensional grid system for the specific part 64 to be measured. All datums are fixed positions, each representing a specific axis with which the three dimensional grid surrounding the tool or part to be measured is thereby constructed.

Each of the LED units 58, 60 and 62 previously identified is mounted upon a pin or like structure and is seated within the associated bushing of the fixed Datum Block A 22, two way slide Datum Block B 24 and single slide Datum Block C 30. The Point Location Analysis program provides the offset variables for the LEDS 58, 60 and 62 relative to their bushing mounts 34, 36 and 38, respectively. At this point, the PLA program will determine the overall length and width of the coordinate grid to be established and will calculate the distance between fixed Datum A 22 and two way slide Datum B 24. Coordinate x, y and z values are entered for each Datum block and pin, as well as similar x, y and z values of two points along each axis representing the size of the parts to be measured.

An operator holds a certified reference bar (not illustrated but known in the art to be a conventional component in use with the Metronor cameras or other suitable photogrammatic device) over the tool in view of both the cameras 48 and 50. Embedded within the reference bar are several additional LED units. The distances between the LED's are pre-measured and certified. The reference bar is then rotated vertically, horizontally and at oblique angles to the cameras so that the Metronor system can create an overall calibrated volume of measurement.

At this point, the calibrated volume of measurement created by the Metronor system is translated into an orthogonal coordinate system level to gravity. A first of the pin mounted LED units (identified at 58) is installed within the bushing receptacle or hole 34 defined in fixed Datum Block A 22. The Metronor cameras 48 and 50 measure the position of the fixedly mounted LED 58 and respond by creating a mathematical plane 66 (z plane as shown in FIG. 4) level to gravity and through the LED point of Datum A.

The second LED 60 is attached to the two-way slide of Datum B 24. The Metronor system measures the position of the second LED 60 and compares to its stored and desired values. The operator repositions the second LED 60 in a first up or down direction along the slide 28 and until the second LED 60 intersects the plane created through the first LED 58 (Datum A). At this point, the vertical slide 28 is locked in place and the operator then proceeds to actuate the horizontal (y plane) slide 26 in directions towards and away from Datum A 22 until a measured distance between Datum A 22 and Datum B 24 equals that assigned by the PLA software program. At this point the slide 26 is locked in place and a second plane 68 (y plane as shown in FIG. 3) is created through Datum LED points "A" and "B" and perpendicular to the z plane 66.

The third LED unit 62 is attached to the one way slide 32 of Datum C 30 and is moved up or down until the LED point intersects the plane 66 created through Datum A (z plane). The Metronor operator then creates a third plane 70 (x plane in FIG. 3) through the Datum point "A" and which is perpendicular to both the "y" 68 and "z" 66 planes. The calibrated volume of measurement created earlier is now an orthogonal coordinate system and, using data collected earlier from the software program, the operator will reassign x, y and z coordinates for Datum's A, B and C. The Metronor system will then translate all data to create a volume of measurement that is orthogonal and in the body coordinate of the part or subassembly to be measured.

Referring again to FIGS. 1, 2 and 4, a plurality of individual positionable and supporting units 72, 74, 76, 78 and 80 (FIGS. 1 and 2) are utilized upon the platform surface 12 of the part holding fixture device 10 for holding and securing the part 64 in the desired orientation dictated by the PLA software program and so that the Metronor cameras (or other suitable measuring technology device) can assess and analyze the part 64. The planar surface of the platform assembly is further defined by an xy grid of spaced apart tap holes 82 (FIG. 3), these each typically being ⅜" in diameter and according to any desired depth. The holes are further preferably spaced at 2" increments.

Figure 5:
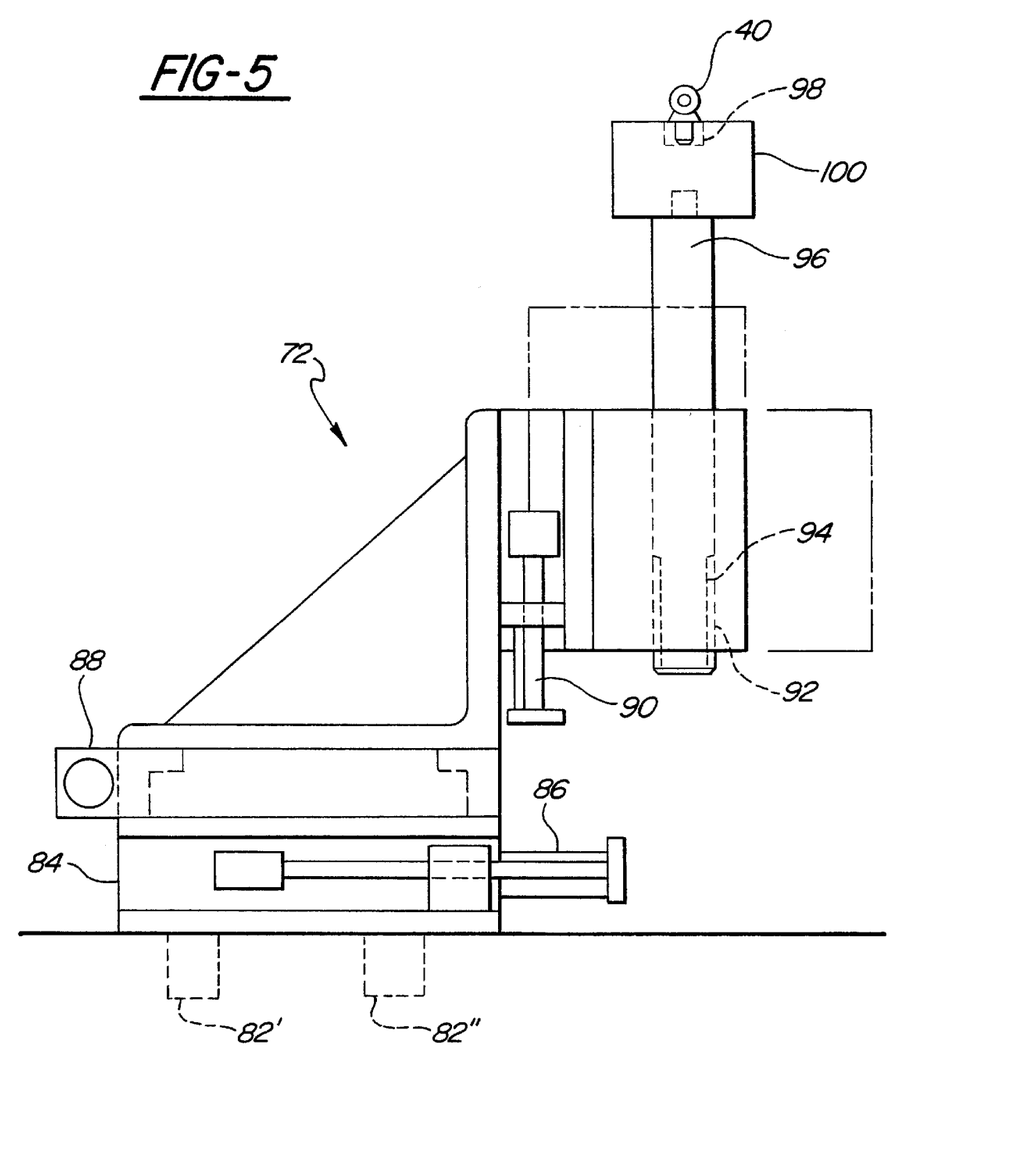
FIG. 5 is an enlarged view in side profile of a support and locating unit according to the present invention.

Each of the positionable and supporting units (and as is specifically illustrated by the enlarged view of the first unit 72 illustrated in FIG. 5) include a platform base 84 suitable for engaging a set subplurality of tap holes 82' and 82" according to the platform grid. Referring to FIGS. 1 and 2 once again, fasteners such as bolts 83 are evident for providing the desired engagement and typically four such holes 82 are engaged by a selected unit. It is also envisioned that the flat bottomed platform base 84 may include any other type of downwardly extending pin or projections for engaging any other number of the tap holes this being a function of the sizing of the unit 72 as well as the holding and supporting demands of the part 64. The positionable/supporting unit 72 further is constructed with first 86, second 88 and third 90 slides, each further controlled by adjustment handles or screws as illustrated. The slides 86, 88 and 90 permit the unit 72 to be adjusted along each of the three axes.

Referring again to FIG. 5 and also to FIG. 6, a block 92 with a tapped hole 94 (typically 1.0" in diameter) is secured to a vertical surface on the third up and down slide 90 of unit 72. A 1.0" diameter rod 96 (or rod of any other suitable diameter or dimension) with a 0.25" diameter thread at the top end is inserted into the vertical block 92 and provides additional travel in the vertical direction. An electromagnet 100 (see FIG. 6) with a 0.25" diameter press-fit bushing 98 is attached to the end of the threaded stud of the rod 96. An LED unit (such as that previously described at 40 in FIG. 6) is attached to the electromagnet's bushing 98 and the offset provided by the LED 40 is again compensated for in the program analysis software. Referring again to FIG. 6, it is understood that the LED 40 can be substituted by any other suitable target device, such as the reflector target 42, coordinate measurement machine Hubbs Bushing 44 and data collector target 46.

The operator selects the first support unit 72 and places it atop the platform. The unit 72 is moved in a direction to a first locating point assigned by the location analysis software and as read by the Metronor cameras 48 and 50. The Metronor system measures the position of the LED 40 on the unit 72 and compares it to the locating point assigned for the part and according to a CAD model associated with the software. A provisional net or temporary center point is selected in the software model and is assigned a 0.50" offset. This temporary center point becomes the nominal location for the associated unit and determines at what location it is secured within associated tap holes 82 of the xy grid pattern, such as through the use of the bolt fasteners, pins and other suitable securing means known in the art.

Using the adjustment screws for slides 86, 88 and 90 on the unit 72, the operator moves the LED 40 until its point coordinates are the same as the nominal point on the CAD model. At this point, all three slides 86, 88 and 90 are locked in position and the LED 40 for the associated unit 72 is removed and replaced with another pin providing a suitable and upwardly facing part support location. The process is again repeated with each additional positioning and support unit 74, 76, 78 and 80 for each CAD assigned support value.

Figure 7:
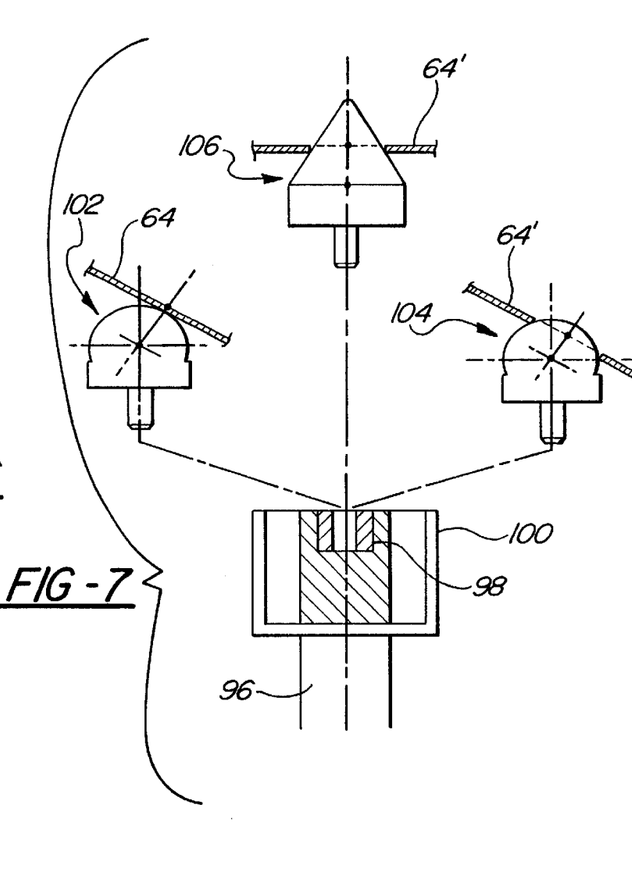
FIG. 7 illustrates a further array of support pin configurations which replace those measurement targets employed with the support and locating units and which are utilized for supporting and holding the part to be measured in a fixed and secure manner.

Referring now to FIG. 7, such supports include spherical pins 102 and 104 and cylindrical tapered pins, such as illustrated at 106. The configurations of the support pins 102, 104 and 106 further account for their ability to secure the part to be measured in vertically/gravity supported fashion, rotatably resistive supported fashion and pivotally resistive supportive fashion as will be subsequently illustrated in greater detail. The geometry of the part 64, include bends, dips, recesses, projections and apertures can be exploited along with the arrangement and positioning of the units, as well as the type of support or engagement pin employed, to securely locate and position the part in a resistively held fashion in all directions as previously described.

As best shown in FIG. 7, the first spherical pin 102 secures a first location of the part 64 in a purely vertical gravity supporting manner. The second spherical pin 104 secures a second location 64' of the part through a first configured recess and so that an upper portion of the spherical surface projects therethrough. Accordingly, the pin 104 provides the combined functions of vertical support as well as a degree of anti-pivot and anti-rotative support. Finally, the cylindrical tapered pin 106 secures a third location 64" of the part through a second configured recess and so that the pointed/tapered end of the pin 106 projects upwardly therethrough. Accordingly, the pin 106 provides the same vertical, pivoting and anti-rotative support as attributed to the second pin 104. It is also understood that the standard art in locating such part support pins may also be utilized within the scope of the instant invention.

Figure 8:
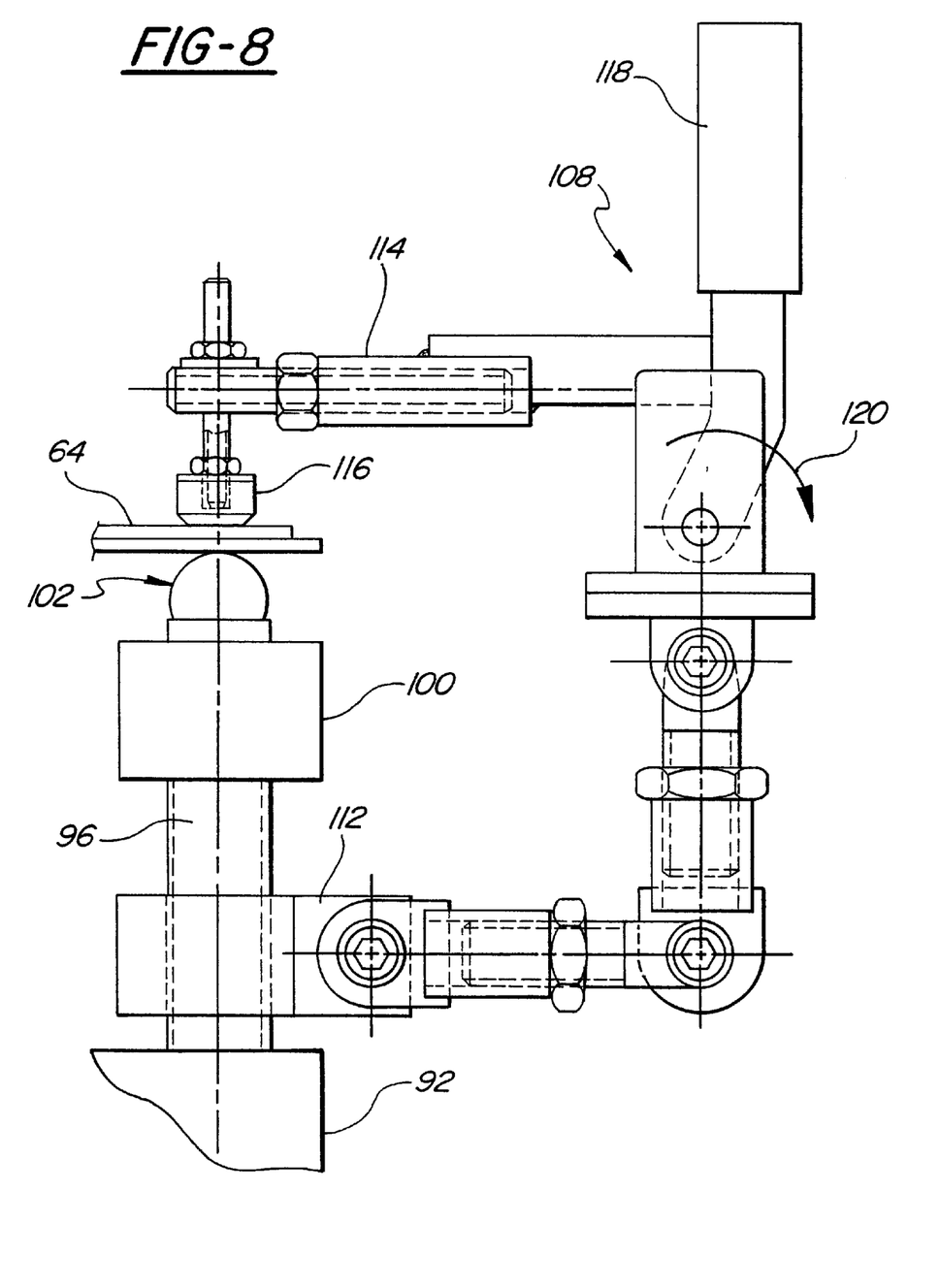
FIG. 8 illustrates an affixable clamp assembly which may be utilized as an additional measure for securing a part at a given location and according to the present invention.

Referring finally to FIG. 8, a separately affixable clamp 108 is illustrated and which may be applied to a selected location and support unit to provide additional and downward holding force against the part 64 at a specified location. The clamp 108 includes a vertically extending and main body with a first horizontally extending lower portion terminating in a coupling 112 which engages the vertically extending shaft 96 of the selected unit. A second horizontally extending and upper portion 114 terminates in a downwardly and threadably actuable stop 116 which engages an upper surface of the part 64 to be held. An actuable handle 118 is provided as part of a linkage assembly of the clamp 108 and may be pivoted in a direction as indicated at 120 to pinch the location of the part 64 between the stop 116 and a selected one of the workpiece support pins (again such as 102). The clamp 108 is therefore provided as an additional and separate means for providing yet more affixation of the part 64 within the scope of the instant invention.

The operating program will determine how many support points are employed for a tool or other workpiece of specified geometry. In most instances, up to several such units are employed and each support pin of an associated unit is arrayed in a different three dimensional coordinate position to assist in support of the part to be measured.

The present invention contemplates that the part to be measured and analyzed, typically tooling or the like, is constructed with a primarily steel content. Accordingly, and as a final step, a 12V/24V power supply (not shown) is engaged and each of the electromagnets previously described are energized so that an electromagnetic flow through the employed support pins and the abutting surfaces of the part 64 draws down and holds the part in immovable and non-vibratory fashion during subsequent measuring and analysis.

The invention also provides the ability to verify the accuracy of the selected measuring system. This is accomplished by removing any or all of the adjustment screws associated with each positioning and support unit and replacing each with a digital micrometer, such by itself being known in the art and therefore not illustrated. The digital micrometer typically possesses a certified accuracy of 0.00005" or 0.001 mm and may be quickly employed and compared to what the CMM and Metronor cameras to determine if recalibration of the measurement system is necessary. Such recalibration may be necessary (typically on an yearly basis) due to wear on components which can be in the range of a 1/10 of a millimeter.

A method for constructing a universal part holding device and fixture assembly is further disclosed according to the structure and details previously set forth and includes such steps as the setting up of the Datum points and axes "A", "B" and "C", the establishment of the orthogonal coordinate system, the location and securement of the individual part supporting units upon the platform and the replacement of the measurement target with the pin supports for engaging the part to be measured. Additional steps include the arrangement of the photogrammetry cameras, the employment of coordinate designation software and the use of additional clamps for providing additional holding support of the part at specified locations.

Accordingly, it is evident that the present invention teaches a universal part holding and fixture assembly which holds a selected part to be measured and analyzed in a specific orientation and with no fixture build errors. The total measurement error is typically that of the measuring device used to measure the part. The present invention is further portable and can perform part inspection at any location. Furthermore, inspection in a separate climate controlled room is no longer necessary.

Having described my invention, additional preferred embodiments will become apparent to those skilled in the art to which it pertains and without deviating from the scope of the appended claims.

I claim:

1. A fixture assembly for holding a part to be measured in a specified and elevated orientation, said fixture assembly being utilized in combination with an existing coordinate measurement machine, said fixture assembly comprising:
   a transportable body having a horizontally arrayed and upwardly facing platform;
   the coordinate measurement machine being adapted to be arranged in proximity to said transportable body;
   first, second and third datum blocks being secured to said upwardly facing platform at first, second and third selected locations, said datum blocks each further including an upwardly facing tapped hole for receiving a measurement target and which is capable of being manipulated according to instructions provided by the coordinate measurement machine to define first, second and third datum planes according to a coordinate system defined for the part to be measured;
   a plurality of individual support units, each of which being secured upon said platform at a location specified by the coordinate measurement machine, said support units each further including an upwardly facing receptacle bushing within which is defined a tapped hole for receiving a further plurality of measurement targets which are capable of being manipulated according to instructions provided by the coordinate measurement machine and to define an associated plurality of individual part supporting points; and
   each of said further plurality of measurement targets being replaced by a part support pin upon said coordinate measurement machine defining a correct location for said supporting point.

2. The fixture assembly as described in claim 1, the coordinate measurement machine being provided as a pair of photogrammatic cameras operated by a microprocessor driven hardware and software system, said first datum block further comprising a fixed block located at a first corner of said platform, said second datum block further comprising a second block located at a second corner of said platform and having both horizontal and vertical slides, and said third datum block further comprising a third block located at a third corner of said platform having a single vertical slide.

3. The fixture assembly as described in claim 2, said measurement targets installed upon said first, second and third datum blocks further comprising light emitting diodes which are measured by the photogrammatic cameras.

4. The fixture assembly as described in claim 3, said first datum plane comprising a vertical "z" plane being established through a first of said light emitting diodes mounted upon said first datum block, said second datum plane comprising a horizontal "y" plane established between said first and second datum blocks, said third datum plane comprising a horizontal "x" plane between said first and third datum blocks.

5. The fixture assembly as described in claim 2, the microprocessor hardware and software system further comprising a computer within which is loaded a point location analysis software program for assigning said datum planes and said individual part supporting points.

6. The fixture assembly as described in claim 1, the coordinate measurement machine being provided as a pair of photogrammatic cameras operated by a microprocessor driven hardware and software system, each of said support units further comprising a base which is slidable along said upwardly facing platform surface of said transportable body, said platform surface further having defined therein an "xy" grid of spaced apart holes, a subplurality of said holes are engageable by fasteners extending downwardly from said platform base for securing each of said support units at designated locations upon said platform.

7. The fixture assembly as described in claim 6, each of said individual support units further comprising first and second slides for actuating a light emitting diode target supported within said receptacle bushing in "x" and "y" two dimensional directions upon said platform, a third slide being capable of actuating said target in an up and down "z" direction.

8. The fixture assembly as described in claim 1, each of said measurement targets being selected from a group including photogrammetry targets, reflector targets, reference probe targets, and data collection targets.

9. The fixture assembly as described in claim 1, said part support pins further comprising spherical support pins and cylindrical tapered support pins.

10. The fixture assembly as described in claim 1, further comprising a separately affixable clamp for providing additional and downward holding force against the part at a specified location, said clamp including a vertically extending and main body with a first horizontally extending lower portion terminating in a coupling which engages a vertically extending shaft associated with a selected support unit, a second horizontally extending and upper portion terminates in a downwardly actuable stop which engages an upper surface of the part, an actuable handle is provided as part of a linkage assembly of said clamp and may be pivoted to pinch a location of the part between said stop and a selected one of said part support pins.

11. The fixture assembly as described in claim 1, further comprising wheels upon which said transportable body is mounted.

12. The fixture assembly as described in claim 1, said first, second and third datum blocks each further comprising an aluminum block construction.

13. The fixture assembly as described in claim 1, further comprising an electromagnet being secured in proximity to each of said receptacle bushings associated with each of said individual support units, a current flow being introduced through said electromagnet upon location of said individual bushings and installation of said part support pins, said current flow acting to draw down and secure a part supported upon said pins which may be constructed of a suitable metallic material.

14. A method for constructing a fixture assembly for holding a part to be measured and which is utilized in combination with an existing coordinate measurement machine, said method comprising the steps of:

establishing first, second and third datum blocks upon an upwardly facing platform surface;

manipulating said datum blocks in directions instructed by the coordinate measurement machine and in order to identify first, second and third datum points which interpreted by the measurement machine as first, second and third datum planes according to an orthogonal coordinate system established for the part to be measured;

locating and securing each of a plurality of individual part supporting units upon said platform and so that a measurement target held within a receptacle bushing associated with each of said units is located at a three dimensional part support point in space assigned by the measurement machine; and replacing said measurement targets with pin supports for engaging the part to be measured.

15. The method as described in claim 14, the coordinate measurement machine further being provided as a pair of photogrammetry cameras, said method further comprising the step of arranging said photogrammetry cameras at specified angular orientations relative to said platform surface.

16. The method as described in claim 15, further comprising the step of employing coordinate designation software for assigning said first, second and third datum planes and said part support points.

17. The method as described in claim 16, further comprising the step of applying a clamps to provide additional pinching support of the part at specified part support points.

* * * * *